Patented Sept. 11, 1951

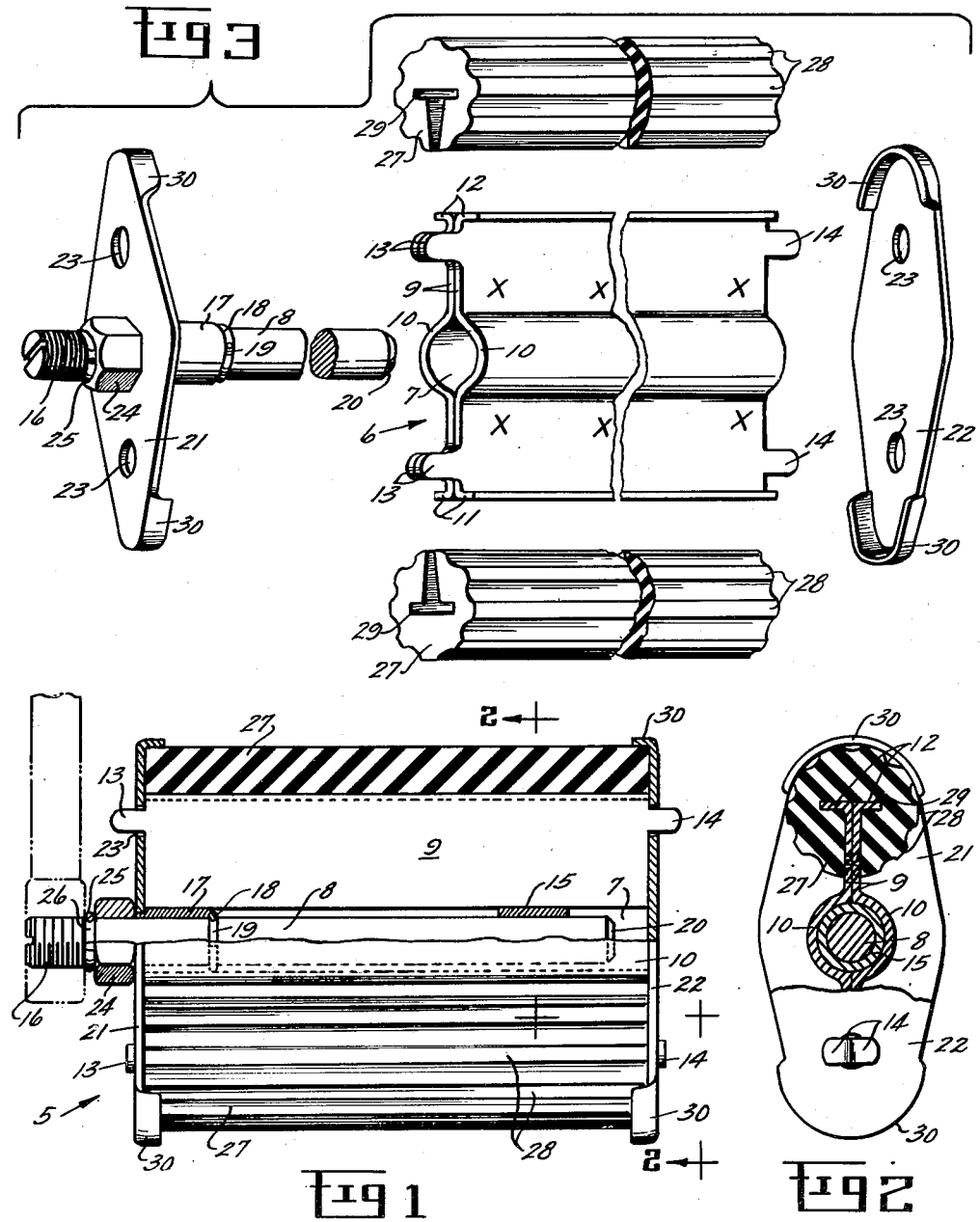

2,567,785

UNITED STATES PATENT OFFICE 2,567,785

PEDAL FOR BICYCLES OR THE LIKE

Nelson M. Rieger, Germantown, Ohio, assignor to The Rieger Manufacturing Company, Miamisburg, Ohio, a corporation of Ohio Application January 9, 1948, Serial No. 1,402

4 Claims. (Cl. 29—148)

This invention relates to a pedal for a bicycle or the like and the method of producing the same.

The main object of the invention is to provide a strong durable pedal which can be produced at low cost.

To this end it is a further object of the invention to provide a pedal of such construction that the component parts thereof may be quickly and easily formed and then assembled into the completed pedal with a minimum number of operations.

A further object of the invention is to provide a simple, efficient and inexpensive method of producing the pedal.

Other objects of the invention may appear as the pedal is described in detail.

In the accompanying drawings Fig. 1 is a plan view, partly in section, of a pedal embodying the invention; Fig. 2 is a section taken on the line 2—2 of Fig. 1, and partly in end elevation; and Fig. 3 is a perspective view of the several parts of the pedal showing them in separated positions.

In these drawings I have illustrated one embodiment of my invention and have shown the same as designed primarily as a bicycle pedal, but it is to be understood that the pedal as a whole, as well as the several parts thereof, may take various forms and may be used for various purposes, without departing from the spirit of the invention.

In the construction here illustrated the pedal comprises a foot piece, shown at 5 in Figs. 1 and 2 and including a body member 6 having therein a longitudinal opening 7 adapted to receive an elongate supporting member 8 which is adapted to be connected with the pedal arm of a bicycle, or other part to be operated. Preferably the body member 6 comprises two plates 9 each of which is formed, as by forming dies, with a longitudinal groove 10, with flanges 11 and 12 at the respective edges thereof and with lugs 13 and 14 at the respective ends thereof, and are rigidly secured one to the other in face to face relation, as by spot welding. The two plates are identical in size and shape and when so connected one with the other the grooves 10 are in opposed relation one to the other to form the opening 7. The flanges of each pair, 11 and 12, extend outwardly substantially in a common plane and the lugs of each pair, 13 and 14, project lengthwise from the ends of the body member in superposed relation. Mounted in the opening 7 adjacent one end thereof is a bearing 15 which is here shown as a relatively short cylindrical sleeve, the bearing being preferably pressed into the opening 7 with a tight fit so as to be held against rotation therein. The bearing may be of any suitable material but is preferably formed of self-lubricating material, such as powdered metal.

The supporting member 8 may be of any suitable character and is here shown as a section of round rod which is provided adjacent its outer end with means, such as a screw threaded portion 16, by which it may be secured to the device to be operated. Rotatably mounted on a cylindrical portion of the supporting member is a second bearing member 17 which is held against material movement longitudinally of the supporting member, as by a snap ring 18 inserted in a groove 19 in the supporting member at the inner end of the bearing 17. The bearing is held against outward movement in a manner which will hereinafter appear. The inner end of the supporting member is slightly tapered at 20 to facilitate its entrance into the first mentioned bearing member 15. Preferably the supporting member is inserted in the opening 7 through that end of the opening remote from the bearing 15, with its inner portion in that bearing, and the second bearing 17 is pressed tightly into the adjacent end of the opening 7.

End members 21 and 22 are secured to the respective ends of the body member and in the present instance each end member is in the form of an elongate plate having adjacent its ends openings 23 to receive the lugs at the adjacent end of the body member. Preferably the end plate 21 is rotatably mounted on the supporting member 28 prior to inserting the latter in the body member and as here shown it bears against the outer end of the bearing 17 and is held substantially in contact with the latter by a retaining member 24, here shown as a collar pressed tightly onto the supporting member on the outer side of the end plate 21. A split ring 25 is mounted in a groove 26 in the supporting member between the collar 24 and the threaded portion 16 of the supporting member to positively lock the collar, and therefore the end plate and the bearing 17, against outward movement with relation to the supporting member.

Tread members 27 are mounted on the lateral portions of the body member 6 prior to the mounting of the latter on the supporting member. As here shown these tread members are substantially cylindrical in form and are provided on the exterior surfaces thereof with longitudinal ribs 28, the tread members being preferably of friction material, such as a rubber composition. Each tread member is provided with a longitudinal T-slot 29 of a shape and size adapted to fit over the T-shaped edge portion formed by the flanges at one edge of the body member. The tread member is mounted on the body member by slipping the same lengthwise over the flanged edge portion of the latter, and the size of the slot 29 is such as to grip the body member and hold the tread member against longitudinal movement, at least during the assembling of the pedal. Each end member 21 and 22 is provided at each end with an arcuate flange 30 which, when the parts are assembled extends about the adjacent ends of one of the tread members. The body portions of the end plates contact directly with the ends of the tread members, so that the latter are firmly and permanently secured to the body member.

When the plates 9 have been formed and assembled into the body member and the bearing 17 and end plate 21 have been rotatably mounted upon the supporting member 8, the bearing 15 is pressed into the opening 7, the supporting member is inserted into the opening 7 with its inner end in the bearing 15, and longitudinal pressure is exerted on the supporting member to press the bearing 17 tightly into the opening 7 and to move the end plate 21 into engagement with the adjacent end of the body member, with the lugs 13 extending through the openings 23 in that end plate. The second end plate 22 is placed in engagement with the other end of the body member with the lugs 14 extending through the openings in the plate 22. Prior to placing the end plates in engagement with the body member the tread members 27 are mounted on the flanged edges of the body member, so that when the end plates are so placed they will engage the respective ends of the tread members and the flanges 30 will extend about the outer portions of the tread members. The lugs of each pair, 13 and 14, are then bent or crimped onto the outer sides of the respective end plates to rigidly and permanently secure the several parts of the pedal in their assembled relations.

The pressure required to press the bearing 17 into the opening in the body member may be provided in any suitable manner as by placing the partly assembled pedal in a press and subjecting the same to the necessary pressure, and means, not shown, may be provided for crimping the lugs onto the end plates during the pressing operation.

It will be apparent from the foregoing description that the major portions of the pedal may be constructed of inexpensive sheet metal which can be quickly blanked and formed on a punch press, and that the supporting member may be formed of standard round stock and requires a minimum of machine operations. Both the body unit and supporting unit can be quickly and easily assembled and then connected one with the other as above described. As a result the pedal is of a very strong rigid construction and can be produced at a low cost.

While I have shown and described one form of pedal and one method of producing the same, I wish it to be understood that I do not desire to be limited to the details thereof as various modifications may occur to a person skilled in the art.

Having now fully described my invention what I claim as new and desire to secure by Letters Patent is:

1. A method of producing a pedal which comprises forming in each of two plates a groove extending for the full length thereof and having end portions substantially semi-cylindrical in cross section, rigidly securing said plates one to the other with said grooves in opposed relation to form between said plates a longitudinal opening having cylindrical end portions, pressing a cylindrical bearing sleeve tightly into said opening to a position adjacent one end thereof and wholly within said opening, rotatably mounting a second cylindrical bearing sleeve on one end portion of an elongate supporting member having cylindrical end portions, inserting the other end of said supporting member through that end of said opening which is remote from the first mentioned bearing and into said first mentioned bearing, pressing said second bearing into the last mentioned end portion of said opening and securing said supporting member against substantial axial movement in said bearings.

2. A method of producing a pedal which comprises forming in each of two plates a longitudinal groove extending for the full length thereof, rigidly securing said plates one to the other with said grooves in opposed relation to form a cylindrical opening between said plates, pressing a cylindrical bearing sleeve tightly into said opening to a position within said opening and adjacent one end thereof, rotatably mounting a second bearing sleeve on one end of a cylindrical supporting member, inserting the other end of said supporting member through that end of said opening which is remote from the first mentioned bearing and into said first mentioned bearing, pressing said second bearing sleeve into the last mentioned end portion of said opening and securing said supporting member against substantial axial movement in said bearings.

3. A method of producing a pedal which comprises forming in each of two plates a longitudinal groove extending for the full length thereof, rigidly securing said plates one to the other with said grooves in opposed relation to form a cylindrical opening between said plates, pressing a cylindrical bearing sleeve tightly into said opening to a position within the same and adjacent one end thereof, rotatably mounting a second cylindrical bearing sleeve on one cylindrical end portion of an elongate supporting member, mounting an apertured end member on said supporting member on the outer side of said second bearing sleeve, securing said second bearing sleeve and said plate against movement lengthwise of said supporting member, inserting the other end of said supporting member through that end of said opening opposite the first mentioned bearing and into said first mentioned bearing sleeve, pressing said second bearing sleeve into the adjacent end of said opening and securing said end plate to the first mentioned plates.

4. A method of producing a pedal which comprises forming in each of two plates a longitudinal groove extending for the full length thereof and with lugs projecting beyond the respective ends thereof on the opposite sides of the respective grooves, rigidly securing said plates one to the other to form between them a longitudinal opening having cylindrical end portions, pressing a cylindrical bearing sleeve tightly into said opening to a position within and adjacent one end of said opening, rotatably mounting on one end portion of an elongate supporting member having cylindrical end portions a second cylindrical bearing sleeve and an end plate having a central opening to receive said supporting member and other openings on the opposite side of said central opening, securing said second bearing sleeve and said end plate against movement lengthwise of said supporting member, inserting the other end of said supporting member in the opening between the first mentioned plates and into the first mentioned bearing sleeve, pressing said second bearing sleeve tightly into the opening between said first mentioned plates, moving said end plates over the lugs on the adjacent ends of said first mentioned plates, placing a second end plate on the lugs of the other ends of said first mentioned plates and clamping said lugs onto both said plates.

NELSON M. RIEGER.

REFERENCES CITED

The following references are of record in the file of this patent:

UNITED STATES PATENTS

| Number | Name | Date |
|---|---|---|
| 520,009 | Perkins | May 15, 1894 |
| 1,352,446 | Glanz | Sept. 14, 1920 |
| 1,519,327 | Peace | Dec. 16, 1924 |
| 1,665,207 | Howell | Apr. 10, 1928 |
| 1,903,776 | Clark | Apr. 18, 1933 |
| 2,290,451 | Schwinn | July 21, 1942 |

FOREIGN PATENTS

| Number | Country | Date |
|---|---|---|
| 413,341 | Great Britain | July 9, 1934 |
| 565,724 | Great Britain | Nov. 24, 1944 |
| 550,970 | France | Dec. 23, 1922 |
| 698,412 | Germany | Nov. 9, 1940 |